United States Patent Office 3,780,052
Patented Dec. 18, 1973

3,780,052
TRIAZOLINE PHOSPHATES
Tony Cebalo and John L. Miesel, Indianapolis, Ind., assignors to Eli Lilly and Company, Indianapolis, Ind.
No Drawing. Filed July 19, 1972, Ser. No. 273,224
Int. Cl. A01n 9/36; C07f 9/08
U.S. Cl. 260—308 C                 6 Claims

ABSTRACT OF THE DISCLOSURE

A class of 5-oxo(thioxo)-3-fluoroalkyl-4-substituted-$\Delta^2$-1,2,4-triazolin-1-yl vinyl phosphates have insecticidal and acaricidal utility.

BACKGROUND OF THE INVENTION

Organic chemists have been active for many years in research directed toward the synthesis and development of new insecticides and acaricides. It has been known for years that organic chemical insecticides are very valuable to man. Organic chemical insecticides, which have been synthesized in chemical research programs, are useful in increasing crop yields, in increasing yields of the products of animal culture, and in killing insects and acarids which are directly harmful to man.

Despite the high degree of perfection to which the organic chemical insecticide art has been brought, many problems remain to be solved by new and better insecticides. For example, after a typical insecticide has been used for a period of time, the insects and acarids which have been exposed to it develop resistance. That is, those individuals which are exposed but are not killed by the insecticide tend to produce young which will also be uninjured by the insecticide. Over a period of many generations, the inherited trait of resistance to that insecticide becomes very strong. Further, no insecticide is so perfect that it could not be beneficially replaced by new insecticides of higher activity, higher selectivity, or less hazard to man, to crop plants, or to animals.

Therefore, those individuals and organizations engaged in research in organic chemical insecticides continue to search for newer and better compounds. A particularly productive field of chemistry in which new insecticides continue to be found is the field of organic phosphates. For example, useful additions to the phosphate insecticide art were made by the following chemical researchers.

Belgian Pat. 741,142 disclosed phosphate derivatives wherein the phosphate moiety is linked to a pyrazole or benzopyrazole ring through a vinyl or substituted-vinyl group.

Netherlands Pat. 7018254 taught a class of phosphates wherein the phosphate moiety is linked to a chloro-substituted benzene ring through a bromovinyl group.

Netherlands Pat. 7013728 taught a class of vinyl phosphate derivatives of a number of heterocyclic rings containing sulfur, oxygen, or nitrogen.

Japanese Pat. 14,478/71 disclosed phosphates said to have insecticidal and herbicidal activity, wherein the phosphate moiety is linked through a dichlorovinyl group to a dichlorobenzene ring.

Cebalo, West German Auslegeschrift 2,029,375, and Timmler, U.S. Pat. 3,594,390, disclosed the insecticidal utility and the methods of preparation of 5-thioxo-$\Delta^2$-1,2,4-triazoline phosphorus derivatives.

British Pat. 713,278 disclosed insecticidal activity of phosphorus derivatives of a very wide range of heterocyclic ring compounds containing oxo or thioxo groups.

Our invention disclosed in this specification and claims deals, as do the above references, with phosphorus derivatives of a hetero ring compound. However, it will be clear to those skilled in the organic chemical art, and especially to those skilled in the phosphate field of the organic chemical insecticide art, that the present invention is distinct from all earlier work.

SUMMARY

We have now discovered a defined class of 5-oxo(thioxo)-3-fluoroalkyl-4-substituted - $\Delta^2$ - 1,2,4-triazolin-1-yl vinyl phosphates which are effective insecticides and acaricides. We have also invented insecticidal and acaricidal compositions which comprise our new vinyl phosphates and appropriate carriers. We have also discovered insecticidal and acaricidal methods which make use of our new vinyl phosphates.

DESCRIPTION OF THE PREFERRED EMBODIMENT

Our new triazoline phosphates are of the formula $$\begin{array}{c} R^1\!-\!C\!-\!R^2 \quad O \quad O\!-\!R^5 \\ F \quad N\!-\!\!-\!\!-\!N\!-\!C\!-\!O\!-\!P \\ F\!-\!C\!-\!C \qquad C\!=\!X \qquad O\!-\!R^6 \\ R^3 \quad N \\ R^4 \end{array}$$

wherein

X represents
  (A) oxygen, or
  (B) sulfur;
$R^1$ and $R^2$ independently represent
  (A) chloro,
  (B) bromo,
  (C) $C_1$-$C_2$ alkyl, or
  (D) hydrogen;
$R^3$ represents
  (A) hydrogen,
  (B) fluoro,
  (C) chloro,
  (D) trifluoromethyl, or
  (E) difluoromethyl;
$R^4$ represents
  (A) $C_1$-$C_4$ alkyl,
  (B) $C_3$-$C_4$ alkenyl,
  (C) $C_3$-$C_8$ cycloalkyl,
  (D) $C_2$-$C_6$ dialkylamino, or $$\text{(E)} \quad N\!=\!C\!\!\begin{array}{c} R^6 \\ \\ R^7 \end{array};$$

$R^5$ represents $C_1$-$C_4$ alkyl;
$R^6$ and $R^7$ independently represent
  (A) hydrogen,
  (B) $C_1$-$C_4$ alkyl, or
  (C) phenyl, optionally monosubstituted with
    (1) $C_1$-$C_3$ alkyl,
    (2) $C_1$-$C_3$ alkoxy,
    (3) halo, or
    (4) $C_1$-$C_3$ haloalkyl.

In the above generic formula the general chemical terms bear their usual meanings in the organic chemical art. Examples of the groups which are referred to by the general terms will be given in order to assure that the formula is understood by those skilled in the art.

The terms $C_1$-$C_2$ alkyl, $C_1$-$C_3$ alkyl, $C_3$-$C_8$ cycloalkyl, $C_1$-$C_4$ alkyl, $C_3$-$C_4$ alkenyl, and $C_1$-$C_3$ alkoxy refer to chemical groups such as methyl, ethyl, isopropyl, butyl, s-butyl, allyl, crotyl, ethoxy, isopropoxy, cyclopentyl, and cyclooctyl.

The term halo refers to fluoro, chloro, bromo and iodo.

The term $C_1-C_3$ haloalkyl refers to groups such as dichloromethyl, trifluoromethyl, tetrafluoroethyl, 2-bromoethyl, and 2,2-diiodopropyl.

The term $C_2-C_6$ dialkylamino refers to groups such as diethylamino, ethylpropylamino, and dipropylamino.

The two groups identified as $R^5$ are identical in each instance.

The following compounds, which are exemplary but not exhaustive of our new triazoline phosphates, are named in order to make the scope of our invention more clear.

[2-bromo-2-chloro-1-(3-difluoromethyl-4-methyl-5-oxo-$\Delta^2$-1,2,4-triazolin-1-yl)vinyl] dipropyl phosphate
[2-bromo-1-(4-isopropyl-5-thioxo-3-trifluoromethyl-$\Delta^2$-1,2,4-triazolin-1-yl)vinyl] diisopropyl phosphate
dibutyl [1-(4-s-butyl-3-difluoromethyl-5-oxo-$\Delta^2$-1,2,4-triazolin-1-yl)-2-chloropropenyl] phosphate
dimethyl [1-(4-propyl-5-thioxo-3-trifluoromethyl-$\Delta^2$-1,2,4-trazolin-1-yl)-1-butenyl] phosphate
di-s-butyl [1-(3-difluoromethyl-5-oxo-4-methallyl-$\Delta^2$-1,2,4-triazolin-1-yl)-2-methyl-1-butenyl] phosphate
[2,2-dibromo-1-[4-(2-methallyl)-5-thioxo-3-trifluoromethyl-$\Delta^2$-1,2,4-triazolin-1-yl)vinyl] dimethyl phosphate
[1-[4-(2-butenyl)-3-difluoromethyl-5-oxo-$\Delta^2$-1,2,4-triazolin-1-yl]-2-methylpropyl] di-t-butyl phosphate
diethyl [1-(4-dipropylamino-5-thioxo-3-trifluoromethyl-$\Delta^2$-1,2,4-triazolin-1-yl)vinyl] phosphate
dibutyl [2-chloro-1-(3-difluoromethyl-4-dimethylamino-5-oxo-$\Delta^2$-1,2,4-triazolin-1-yl)-1-butenyl] phosphate
[2-bromo-1-(4-diisopropylamino-5-thioxo-3-trifluoromethyl-$\Delta^2$-1,2,4-triazolin-1-yl)propenyl] dimethyl phosphate
[2-bromo-1-(3-difluoromethyl-4-diethylamino-5-oxo-$\Delta^2$-1,2,4-triazolin-1-yl)propenyl] di-s-butyl phosphate
[1-(4-butylideneamino-5-thioxo-3-trifluoromethyl-$\Delta^2$-1,2,4-triazolin-1-yl)-2-chlorovinyl] dipropyl phosphate
di-t-butyl [2-ethyl-1-(3-difluoromethyl-4-methyleneamino-5-oxo-$\Delta^2$-1,2,4-triazolin-1-yl)-1-butenyl] phosphate
[2-chloro-1-[4-[(1-ethylpropylidene)amino]-5-thioxo-3-trifluoromethyl-$\Delta^2$-1,2,4-triazolin-1-yl]propenyl] diisopropyl phosphate
dibutyl [1-[5-oxo-3-(1,1,2,2-tetrafluoroethyl)-4-(3-trifluoromethylbenzylideneamino)-$\Delta^2$-1,2,4-triazolin-1-yl]vinyl] phosphate
[1-[3-chlorodifluoromethyl-4-(4-methylbenzylideneamino)-5-thioxo-$\Delta^2$-1,2,4-triazolin-1-yl]butenyl] diethyl phosphate
[1-[3-difluoromethyl-5-oxo-4-(2-propylbenzylideneamino)-$\Delta^2$-1,2,4-triazolin-1-yl]vinyl] dipropyl phosphate
[1-[4-(4-bromobenzylideneamino)-5-thioxo-3-trifluoromethyl-$\Delta^2$-1,2,4-triazolin-1-yl]vinyl] dimethyl phosphate
dibutyl [1-[4-(4-ethoxybenzylideneamino)-5-oxo-3-(1,1,2,2-tetrafluoroethyl)-$\Delta^2$-1,2,4-triazolin-1-yl] propenyl] phosphate
[1-[3-chlorodifluoromethyl-4-(2-iodobenzylideneamino)-5-thioxo-$\Delta^2$-1,2,4-triazolin-1-yl] diethyl] phosphate
[1-[3-difluoromethyl-4-(3-methoxybenzylideneamino)-5-oxo-$\Delta^2$-1,2,4-triazolin-1-yl]vinyl] dipropyl phosphate
[1-[4-(4-chlorobenzylideneamino)-5-thioxo-3-trifluoromethyl-$\Delta^2$-1,2,4-triazolin-1-yl)propenyl] dimethyl phosphate
dibutyl [1-[3-chlorodifluoromethyl-4-(3-dichloromethylbenzylideneamino)-5-oxo-$\Delta^2$-1,2,4-triazolin-1-yl] propenyl] phosphate
[1-(4-methallyl-3-pentafluoroethyl-5-thioxo-$\Delta$2-1,2,4-triazolin-1-yl)vinyl] dimethyl phosphate
[1-(4-cyclopropyl-5-oxo-3-trifluoromethyl-$\Delta^2$-1,2,4-triazolin-1-yl)vinyl] diethyl phosphate
[2-chloro-(4-cyclopentyl-3-difluoromethyl-5-thioxo-$\Delta^2$-1,2,4-triazolin-1-yl)propenyl] dimethyl phosphate
[1-[3-chlorodifluoromethyl-4-cycloheptyl-5-oxo-$\Delta^2$-1,2,4-triazolin-1-yl)-1-butenyl] dipropyl phosphate
[2-bromo-1-(3-difluoromethyl-5-oxo-4-pentylideneamino-$\Delta^2$-1,2,4-triazolin-1-yl)propenyl] dimethyl phosphate
[1-(4-ethylideneamino-5-thioxo-3-trifluoromethyl-$\Delta^2$-1,2,4-triazolin-1-yl)propenyl] dimethyl phosphate
[2-bromo-1-[4-[(1-s-butyl-2-methylbutylidene)amino]-3-difluoromethyl-5-oxo-$\Delta^2$-1,2,4-triazolin-1-yl]-1-butenyl] diethyl phosphate The following specific compounds are the preferred species of our invention.

[2-chloro-1-(4-methyl-5-thioxo-3-trifluoromethyl-$\Delta^2$-1,2,4-triazolin-1-yl)vinyl] diethyl phosphate
diethyl [1-(4-methyl-5-thioxo-3-trifluoromethyl-$\Delta^2$-1,2,4-triazolin-1-yl)vinyl] phosphate
diethyl [1-(4-methyl-5-thioxo-3-trifluoromethyl-$\Delta^2$-1,2,4-triazolin-1-yl)propenyl] phosphate
dimethyl [1-(4-methyl-5-thioxo-3-trifluoromethyl-$\Delta^2$-1,2,4-triazolin-1-yl)vinyl] phosphate
diethyl [1-(4-methyl-5-oxo-3-trifluoromethyl-$\Delta^2$-1,2,4-triazolin-1-yl)vinyl] phosphate We have also invented a superior and novel method of killing insects and acarids which comprises contacting the insect or acarid or the locus of the insect or acarid with an effective amount of one of the compounds described above. Further, we have invented insecticidal and acaricidal compositions which comprise an inert carrier and one of the novel compounds of the formula described above.

The most effective methods of contacting insects and acarids, or the locus of insects and acarids, and the most effective formulations of insecticidal and acaricidal compositions will be discussed below in this specification.

Our novel triazoline phosphates are made by the following general methods of synthesis, which are methods known to the organic chemical art. The process in each instance comprises forming the triazoline ring, and then adding to the ring the appropriate vinyl phosphate moiety.

All of the compounds which are starting materials for our triazoline phosphates are either readily obtainable or can be made by methods which are well known to the organic chemical art.

Triazolin-5-thione rings are very conveniently made by the process of Cebalo, U.S. Pat. 3,625,951, which process is a ring closure of an appropriately 1,4-disubstituted thiosemicarbazide in basic aqueous solution.

Triazolin-5-one rings are made either by methylation of a triazolin-5-thione followed by oxidation with hydrogen peroxide, or by ring closure of an appropriately substituted semicarbazide by fusion.

The vinyl phosphate group is added to the 1-position of the triazoline ring in two steps without intermediate isolation. An intermediate is formed by reaction of the ring with an appropriately substituted acetic acid in the presence of dicyclohexylcarbodiimide, or by reaction of the ring compound with an appropriately substituted acetyl chloride in the presence of a base such as a tertiary amine. The dialkyl phosphate moiety is then added to the intermediate compound by reaction with a trialkyl phosphite at a temperature from ambient to about 100° C.

The various reactions which are carried out in order to form our novel phosphate compounds may be designed by one skilled in the organic chemical art. The reactions are not unique. The following preparative examples are offered only in order to assure that all may obtain our novel compounds.

The first step in the synthesis of our compounds is the formation of the triazoline ring. The following simple method is effective for the synthesis of triazolin-5-thione rings.

Example 1.—4-methyl-3-trifluoromethyl-$\Delta^2$-1,2,4-triazolin-5-thione

A 12 g. portion of trifluoroacetyl fluoride was added slowly to a well stirred mixture of 10.9 g. of 4-methylthiosemicarbazide and 8.2 g. of pyridine in 100 ml. of methylene chloride at −60° C. A Dry-Ice condenser was used to prevent the escape of acid fluoride. After the addition, the reaction mixture was allowed to warm to room temperature and was then refluxed for 2 hours. The volatiles were then evaporated under vacuum, and the residue was found to be 4-methyl-1-trifluoroacetylthiosemicarbazide by NMR analysis.

A 4 g. portion of the above intermediate was refluxed for 2 hours with 30 ml. of 10 percent aqueous $Na_2CO_3$. The mixture was then cooled to about 10° C. and acidified with HCl to yield a crude solid product. The crude product was recrystallized from methylene chloride-petroleum ether to yield the purified product, 4-methyl-3-trifluoromethyl-$\Delta^2$-1,2,4-triazolin-5-thione, M.P. 119–120° C.

The above method is used, with slight alterations which readily can be supplied by one skilled in the organic chemical art, to make other triazolin-5-thione compounds. For example, the following compounds are made as above.

4-allyl-3-trifluoromethyl-$\Delta^2$-1,2,4-triazolin-5-thione
4-dimethylamino-3-trifluoromethyl-$\Delta^2$-1,2,4-triazolin-5-thione
4-benzylideneamino-3-trifluoromethyl-$\Delta^2$-1,2,4-triazolin-5-thione
3-difluoromethyl-4-methyl-$\Delta^2$-1,2,4-triazolin-5-thione
4-diethylamino-3-(1,1,2,2-tetrafluoroethyl)-$\Delta^2$-1,2,4-triazolin-5-thione
4-cyclohexyl-3-pentafluoroethyl-$\Delta^2$-1,2,4-triazolin-5-thione The above synthesis is not effective to make our triazolin-5-one ring compounds. Such rings are made by the processes illustrated in the following two examples.

Example 2.—4-methyl-3-trifluoromethyl-$\Delta^2$-1,2,4-triazolin-5-one

A solution was made of 2 g. of 4-methyl-3-trifluoromethyl-$\Delta^2$-1,2,4-triazolin-5-thione and 75 ml. of methanol. To the solution was added 500 mg. of NaOCH$_3$ and the mixture was stirred for 1 hour. Then 2.3 g. of methyl iodide was added, and the reaction mixture was stirred overnight at 50–60° C. The methanol was evaporated under vacuum and the residue was recrystallized from benzene-hexane. The product was found by NMR to be 4-methyl-3-trifluoromethyl-5-methylthio-1H-1,2,4-triazole.

A 2 g. portion of the above intermediate product was heated on the steam bath overnight with 25 ml. of acetic acid and 6 ml. of $H_2O_2$. In the morning the reaction mixture was neutralized to pH 7, cooled, and extracted with ethyl acetate. The ethyl acetate was evaporated under vacuum and the residue was recrystallized from normal hexane. The recrystallized product was 430 mg. of 4-methyl-3-trifluoromethyl-$\Delta^2$-1,2,4-triazolin-5-one, M.P. 79–82° C.

The theoretical microanalysis was 28.75 percent C, 2.41 percent H and 25.15 percent N. The actual analysis was 28.91 percent C, 2.45 percent H, and 25.13 percent N.

The methods of Example 2 are used, with only minor alterations, to make other triazolin-5-one compounds such as the following.

4-ethyl-3-trifluoromethyl-$\Delta^2$-1,2,4-triazolin-5-one
3-difluoromethyl-4-methyl-$\Delta^2$-1,2,4-triazolin-5-one
4-cyclohexyl-3-trifluoromethyl-$\Delta^2$-1,2,4-triazolin-5-one The method of Example 3 following is an effective one-step synthesis of 3-fluoroalkyl-triazolin-5-ones.

Example 3.—4-methyl-3-trifluoromethyl-$\Delta^2$-1,2,4-triazolin-5-one

A 2 g. portion of 1-trifluoroacetyl-4-methylsemicarbazide was fused in an oil bath at 160–180° C. for about 2 hours. After the gummy mixture had cooled, it was triturated with ethyl acetate, dissolving out the product.

The ethyl acetate solution was concentrated under vacuum, and the solid residue was triturated into benzene. The benzene solution was then chromatographed on 150 ml. of silica gel using mixtures of benzene and ethyl acetate. The fractions which were eluted with 10 percent ethyl acetate-90 percent benzene and 20 percent ethyl acetate-80 percent benzene were combined and recovered by evaporation of the solvents. Recrystallization of the product from benzene-hexane produced 300 mg. of crystalline 4-methyl-3-trifluoromethyl-$\Delta^2$-1,2,4-triazolin-5-one.

The vinyl phosphate moiety of our compounds is added to the triazoline ring moiety in two steps. Examples 4 through 6 illustrate methods which are effective for the synthesis of all of the compounds within the scope of our invention.

Example 4.—[2 - chloro - 1 - (4 - methyl - 5 - thioxo - 3 - trifluoromethyl - $\Delta^2$ - 1,2,4 - triazolin - 1 - yl)vinyl] diethyl phosphate A mixture of 5.5 g. of 4-methyl-3-trifluoromethyl-$\Delta^2$-1,2,4-triazolin-5-thione, 3.9 g. of dichloroacetic acid, and 100 ml. of methylene chloride was cooled to 0° C. To that mixture was added dropwise 6.2 g. of dicyclohexylcarbodiimide in 100 ml. of methylene chloride. The mixture was allowed to warm to room temperature and stirred overnight. The mixture was then cooled in ice and filtered to remove 5.3 g. of dicyclohexylurea.

To the filtrate was added dropwise 5.0 g. of triethyl phosphite in 50 ml. of methylene chloride. That mixture was stirred overnight. The reaction mixture was then heated to reflux for a short time, cooled, and extracted with 2 percent sodium carbonate solution. The organic layer was dried over anhydrous magnesium sulfate and evaporated under vacuum to isolate the crude oil product. That product was chromatographed on 250 ml. of silica gel using ethyl ether as the eluant. The product-containing fractions were combined and evaporated under vacuum to produce 5.0 g. of the colorless liquid product, which was identified by NMR as [2-chloro-1-(4-methyl-5-thioxo-3 - trifluoromethyl - $\Delta^2$ - 1,2,4 - triazolin - 1 - yl)vinyl] phosphate.

Example 5.—[2,2 - dichloro - 1 - (4 - methyl - 5 - oxo - 3 - trifluoromethyl - $\Delta^2$ - 1,2,4 - triazolin - 1 - yl)vinyl] dimethyl phosphate To a mixture of 5.0 g. of 4-methyl-3-trifluoromethyl-$\Delta^2$-1,2,4-triazolin-5-one, 3 g. of triethylamine, and 200 ml. of ethyl ether was added 5.5 g. of trichloroacetyl chloride in 50 ml. of ethyl ether. The mixture was refluxed for 2 hours and then stirred at room temperature overnight. The mixture was filtered and the filtrate was immediately poured into a new flask. To this solution was added 3.7 g. of triethyl phosphite in ethyl ether and the mixture was stirred at room temperature over the weekend.

The solution was washed twice with 2 percent $Na_2CO_3$ solution and the organic layer was then dried over anhydrous magnesium sulfate. The dry organic solution was then evaporated under vacuum to remove the solvents and the product was chromatographed on 250 ml. of silica gel using benzene-ethyl acetate mixtures. The fractions which were found by TLC to contain product were combined and evaporated to produce 4.8 g. of a light yellow liquid which was identified as [2,2-dichloro-1-(4-methyl-5 - oxo - 3 - trifluoromethyl-$\Delta^2$-1,2,4-triazolin-1-yl)vinyl] dimethyl phosphate by NMR.

Example 6.—Diethyl [1- (4 - methyl - 5 - thioxo - 3-trifluoromethyl - Δ² - 1,2,4 - triazolin - 1 - yl)propenyl] phosphate To a mixture of 5.5 g. of 4-methyl-3-trifluoromethyl-Δ²-1,2,4-triazolin-5-thione and 5.3 g. of 2-chloropropionic acid in 100 ml. of tetrahydrofuran was added 6.2 g. of dicyclohexyl-carbodiimide in 100 ml. of tetrahydrofuran. The mixture was stirred at room temperature for 3 days. Then the reaction mixture was filtered, and to the filtrate was added, dropwise, 5 g. of triethyl phosphite in tetrahydrofuran. The filtrate mixture was then stirred at room temperature overnight and then stirred at reflux temperature for 1 hour.

The volatiles were evaporated from the reaction mixture under vacuum, the residue was taken up in ethyl ether, and the ether solution was extracted twice with 2 percent sodium carbonate solution. The ether solution was then dried over anhydrous magnesium sulfate, the ether was evaporated under vacuum, and the residue was chromatographed on 250 ml. of silica gel with ethyl ether as the eluting solvent. The fractions which were found by TLC analysis to contain product were combined and evaporated to produce 3.8 g. of an oily product which was identified by NMR as diethyl [1-(4-methyl-5-thioxo-3-trifluoromethyl-Δ²-1,2,4-triazolin-1-yl)propenyl] phosphate.

The following compounds, exemplary of our novel phosphates, are conveniently synthesized by methods analogous to the methods of Examples 4 through 6.

[1-(4-dimethylamino-5-thioxo-3-trifluoromethyl-Δ²-1,2,4-triazolin-1-yl)vinyl] dimethyl phosphate, oil
[1-(4-allyl-5-thioxo-3-trifluoromethyl-Δ²-1,2,4-triazolin-1-yl)vinyl] dimethyl phosphate, oil
diethyl [1-(4-methyl-5-thioxo-3-trifluoromethyl-Δ²-1,2,4-triazolin-1-yl)vinyl] phosphate, oil
[2,2-dichloro-1-(4-methyl-5-oxo-3-trifluoromethyl-Δ²-1,2,4-triazolin-1-yl)vinyl] diethyl phosphate, oil
diethyl [1-(4-methyl-5-oxo-3-trifluoromethyl-Δ²-1,2,4-triazolin-1-yl)vinyl] phosphate, oil
dimethyl [1-(4-methyl-5-thioxo-3-trifluoromethyl-Δ²-1,2,4-triazolin-1-yl)vinyl] phosphate, oil
[2-chloro-(4-methyl-5-oxo-3-trifluoromethyl-Δ²-1,2,4-triazolin-1-yl)vinyl] diethyl phosphate, oil
[1-(4-benzylideneamino-5-thioxo-3-trifluoromethyl-Δ²-1,2,4-triazolin-1-yl)vinyl] dimethyl phosphate, oil Our new triazoline phosphates are useful for killing insects and acarids. The insecticidal and acaricidal data below shows that our compounds are effective in killing a large variety of species of harmful insects and acarids. The fraction of the contacted pests which will be killed depends on the hardiness of the species of insect and the amount of the compound which contacts them.

It is necessary that at least an effective amount of the pesticidal compound contact the pest to be killed. Effective amounts of pesticides are usually measured by the concentration of the active compound in the insecticidal or acaricidal composition. For example, for a given pest to be controlled, the effective amount might be 5 percent of active compound in a dust composition, or 100 p.p.m. of active compound in a water-dispersed composition. The determination of the effective amount for each pest is accomplished by merely applying different compositions to the pest or the locus of the pest and observing the result. The effective amount of the insecticidal or acaricidal compound is found within the ranges of from about 1 to about 1,000 p.p.m. of active compound in a water-dispersed composition, or within the range from about 0.5 percent to about 10 percent of active compound in a dust composition.

These compounds are active, for example, against such acarids as red spider mite, citrus mite, two-spotted spider mite, Pacific mite, clover mite, fowl mite, various species of ticks, and various species of spiders. The compounds are also active against insects of the various orders including Mexican bean beetle, boll weevil, corn rootworms, cereal leaf beetle, flea beetles, borers, Colorado potato beetle, grain beetles, alfalfa weevil, carpet beetle, confused flour beetle, powder post beetle, wireworms, rice weevil, rose beetle, plum curculio, Japanese beetle, white grubs, melon aphid, rose aphid, white fly, grain aphid, corn leaf aphid, pea aphid, mealybugs, scales, leafhoppers, thrips, citrus aphid, spotted alfalfa aphid, green peach aphid, bean aphid, milkweed bug, tarnished plant bug, box elder bug, bed bug, squash bug, chinch bug, ants housefly, yellow fever mosquito, stable fly, horn fly, fleas, lice, cattle grubs, cabbage maggot, carrot rust fly, seed corn maggot, Southern armyworm, codling moth, cutworms, clothes moth, Indian meal moth, leafrollers, corn earworm, European corn borer, imported cabbage worm, cabbage looper, cotton boolworm, bagworm, sod webworm, tent caterpillar, fall armyworm, German cockroach, and American cockroach.

We have proved the insecticidal and acaricidal efficacy of our compounds by scientific tests. The tests to be reported here were conducted by dissolving the active phosphate compound in a water-miscible solvent, adding emulsifiers, and dispersing the solution in water in an amount to give the concentration which is shown below in each test. That insecticidal or acaricidal composition was then applied to the pest or to the locus of the pest against which the compound was to be tested.

In the tables below, the percentage of the contacted insects or acarids killed by the compound at the named concentration is reported as a rating. A rating of 1, for example means that from 11 to 20 percent of the contacted pests were killed; a rating of 2 indicates that from 21 to 30 percent of the contacted pests were killed, and so forth up to a rating of 9 which indicates that from 91 to 100 percent of the contacted pests were killed.

[2-chloro-1-(4-methyl-5-thioxo-3-trifluoromethyl-Δ²-1,2,4-triazolin-1-yl)vinyl] diethyl phosphate

| Mexican bean beetle: | Percent |
|---|---|
| 500 p.p.m. | 9 |
| 250 p.p.m. | 9 |
| 50 p.p.m. | 9 |
| Southern armyworm: | |
| 500 p.p.m. | 9 |
| 100 p.p.m. | 9 |
| 25 p.p.m. | 7 |
| Melon aphid: | |
| 500 p.p.m. | 9 |
| 100 p.p.m. | 9 |
| 5 p.p.m. | 6 |
| Two-spotted spider mite: | |
| 500 p.p.m. | 9 |
| 100 p.p.m. | 9 |
| 5 p.p.m. | 9 |
| Milkweed bug: | |
| 500 p.p.m. | 9 |
| 100 p.p.m. | 9 |
| Housefly, direct contact: | |
| 500 p.p.m. | 9 |
| 100 p.p.m. | 9 |
| 5 p.p.m. | 7 |
| Housefly, locus contact: | |
| 500 p.p.m. | 9 |
| 100 p.p.m. | 9 |
| 10 p.p.m. | 8 |
| Oriental cockroach: | |
| 500 p.p.m. | 9 |
| 100 p.p.m. | 9 |
| 25 p.p.m. | 8 |
| Boll weevil: | |
| 500 p.p.m. | 9 |
| 100 p.p.m. | 9 |
| 10 p.p.m. | 8 |

Diethyl [1-(4-methyl-5-thioxo-3-trifluoromethyl-Δ²-1,2,4-triazolin-1-yl)vinyl] phosphate Mexican bean beetle: Percent
  500 p.p.m. ------------------------------- 9
  250 p.p.m. ------------------------------- 9
  50 p.p.m. -------------------------------- 9
Southern armyworm:
  500 p.p.m. ------------------------------- 9
  100 p.p.m. ------------------------------- 9
Melon aphid:
  500 p.p.m. ------------------------------- 9
  50 p.p.m. -------------------------------- 9
  5 p.p.m. --------------------------------- 6
Two-spotted spider mite:
  500 p.p.m. ------------------------------- 9
  100 p.p.m. ------------------------------- 9
  10 p.p.m. -------------------------------- 7
Milkweed bug:
  500 p.p.m. ------------------------------- 9
  100 p.p.m. ------------------------------- 8
Housefly, direct contact:
  250 p.p.m. ------------------------------- 9
  50 p.p.m. -------------------------------- 9
  5 p.p.m. --------------------------------- 9
Housefly, locus contact:
  250 p.p.m. ------------------------------- 9
  25 p.p.m. -------------------------------- 9
  5 p.p.m. --------------------------------- 7
Oriental cockroach:
  500 p.p.m. ------------------------------- 9
  100 p.p.m. ------------------------------- 9
  25 p.p.m. -------------------------------- 9
Boll weevil:
  500 p.p.m. ------------------------------- 9
  50 p.p.m. -------------------------------- 8

Diethyl [1-(4-methyl-5-thioxo-3-trifluoromethyl-Δ²-1,2,4-triazolin-1-yl)propenyl] phosphate Mexican bean beetle: Percent
  1,000 p.p.m. ------------------------------ 9
  250 p.p.m. ------------------------------- 9
  25 p.p.m. -------------------------------- 8
Southern armyworm:
  1,000 p.p.m. ------------------------------ 8
Melon apid:
  500 p.p.m. ------------------------------- 9
  100 p.p.m. ------------------------------- 9
  25 p.p.m. -------------------------------- 9
Two-spotted spider mite:
  500 p.p.m. ------------------------------- 9
  100 p.p.m. ------------------------------- 9
  25 p.p.m. -------------------------------- 8
Milkweed bug:
  1,000 p.p.m. ------------------------------ 9
  250 p.p.m. ------------------------------- 9
  25 p.p.m. -------------------------------- 9
Housefly, direct contact:
  500 p.p.m. ------------------------------- 9
  100 p.p.m. ------------------------------- 9
  25 p.p.m. -------------------------------- 9
Housefly, locus contact:
  500 p.p.m. ------------------------------- 9
  50 p.p.m. -------------------------------- 9
  10 p.p.m. -------------------------------- 8
Oriental cockroach:
  1,000 p.p.m. ------------------------------ 8
  500 p.p.m. ------------------------------- 7
Boll weevil:
  1,000 p.p.m. ------------------------------ 9
  100 p.p.m. ------------------------------- 9
  50 p.p.m. -------------------------------- 9

[1-(4-dimethylamino-5-thioxo-3-trifluoromethyl-Δ²-1,2,4-triazolin-1-yl)vinyl] dimethyl phosphate Mexican bean beetle: Percent
  1,000 p.p.m. ------------------------------ 9
  250 p.p.m. ------------------------------- 9
Southern armyworm:
  1,000 p.p.m. ------------------------------ 8
Melon aphid:
  1,000 p.p.m. ------------------------------ 9
  100 p.p.m. ------------------------------- 9
  25 p.p.m. -------------------------------- 9
Two-spotted spider mite:
  1,000 p.p.m. ------------------------------ 9
  100 p.p.m. ------------------------------- 9
  50 p.p.m. -------------------------------- 9
Milkweed bug:
  1,000 p.p.m. ------------------------------ 9
  250 p.p.m. ------------------------------- 9
Housefly, direct contact:
  1,000 p.p.m. ------------------------------ 9
  250 p.p.m. ------------------------------- 9
  50 p.p.m. -------------------------------- 9
Housefly, locus contact:
  1,000 p.p.m. ------------------------------ 9
  250 p.p.m. ------------------------------- 9
  50 p.p.m. -------------------------------- 7
Oriental cockroach:
  1,000 p.p.m. ------------------------------ 9
  500 p.p.m. ------------------------------- 9
  10 p.p.m. -------------------------------- 8

[1-(4-benzylideneamino-5-thioxo-3-trifluoromethyl-Δ²-1,2,4-triazolin-1-yl)vinyl] dimethyl phosphate Mexican bean beetle: Percent
  1,000 p.p.m. ------------------------------ 9
  250 p.p.m. ------------------------------- 8
  100 p.p.m. ------------------------------- 5
Southern armyworm:
  1,000 p.p.m. ------------------------------ 9
  250 p.p.m. ------------------------------- 8
Melon aphid:
  1,000 p.p.m. ------------------------------ 9
  250 p.p.m. ------------------------------- 9
  50 p.p.m. -------------------------------- 9
Two-spotted spider mite:
  1,000 p.p.m. ------------------------------ 9
  250 p.p.m. ------------------------------- 9
  50 p.p.m. -------------------------------- 7
Milkweed bug:
  1,000 p.p.m. ------------------------------ 9
  250 p.p.m. ------------------------------- 9
Housefly, direct contact:
  1,000 p.p.m. ------------------------------ 9
  250 p.p.m. ------------------------------- 9
  50 p.p.m. -------------------------------- 6
Housefly, locus contact:
  1,000 p.p.m. ------------------------------ 9
  250 p.p.m. ------------------------------- 9
  100 p.p.m. ------------------------------- 5
Boll weevil:
  500 p.p.m. ------------------------------- 9
  100 p.p.m. ------------------------------- 5

[1-(4-allyl-5-thioxo-3-trifluoromethyl-Δ²-1,2,4-triazolin-1-yl)vinyl] dimethyl phosphate Mexican bean beetle: Percent
  1,000 p.p.m. ------------------------------ 9
  250 p.p.m. ------------------------------- 9
  50 p.p.m. -------------------------------- 5
Southern armyworm:
  1,000 p.p.m. ------------------------------ 9
  250 p.p.m. ------------------------------- 9
  100 p.p.m. ------------------------------- 9

Melon aphid: Percent
  500 p.p.m. ------------------------------- 9
  100 p.p.m. ------------------------------- 9
  10 p.p.m. -------------------------------- 9
Two-spotted spider mite:
  1,000 p.p.m. ----------------------------- 9
  250 p.p.m. ------------------------------- 9
  50 p.p.m. -------------------------------- 9
Milkweed bug:
  1,000 p.p.m. ----------------------------- 9
  100 p.p.m. ------------------------------- 9
Housefly, direct contact:
  1,000 p.p.m. ----------------------------- 9
  250 p.p.m. ------------------------------- 9
  50 p.p.m. -------------------------------- 8
Housefly, locus contact:
  1,000 p.p.m. ----------------------------- 9
  250 p.p.m. ------------------------------- 9
  25 p.p.m. -------------------------------- 9
Oriental cockroach:
  1,000 p.p.m. ----------------------------- 9
  250 p.p.m. ------------------------------- 9
Boll weevil:
  1,000 p.p.m. ----------------------------- 9
  500 p.p.m. ------------------------------- 7

Diethyl [1-(4-methyl-5-oxo-3-trifluoromethyl-$\Delta^2$-1,2,4-triazolin-1-yl)vinyl] phosphate Mexican bean beetle: Percent
  1,000 p.p.m. ----------------------------- 9
  500 p.p.m. ------------------------------- 9
  50 p.p.m. -------------------------------- 7
Southern armyworm:
  1,000 p.p.m. ----------------------------- 9
  250 p.p.m. ------------------------------- 9
  50 p.p.m. -------------------------------- 7
Melon aphid:
  1,000 p.p.m. ----------------------------- 9
  100 p.p.m. ------------------------------- 9
  10 p.p.m. -------------------------------- 8
Two-spotted spider mite:
  1,000 p.p.m. ----------------------------- 9
  100 p.p.m. ------------------------------- 9
  25 p.p.m. -------------------------------- 7
Milkweed bug:
  1,000 p.p.m. ----------------------------- 9
  250 p.p.m. ------------------------------- 9
Housefly, direct contact:
  1,000 p.p.m. ----------------------------- 9
  250 p.p.m. ------------------------------- 9
  50 p.p.m. -------------------------------- 9
Housefly, locus contact:
  1,000 p.p.m. ----------------------------- 9
  250 p.p.m. ------------------------------- 9
  25 p.p.m. -------------------------------- 9
Oriental cockroach:
  1,000 p.p.m. ----------------------------- 9
  250 p.p.m. ------------------------------- 9
  50 p.p.m. -------------------------------- 7
Boll weevil:
  1,000 p.p.m. ----------------------------- 9
  100 p.p.m. ------------------------------- 9

[2,2-dichloro-1-(4-methyl-5-oxo-3-trifluoromethyl-$\Delta^2$-1,2,4-triazolin-1-yl)vinyl] diethyl phosphate Mexican bean beetle: Percent
  1,000 p.p.m. ----------------------------- 9
  500 p.p.m. ------------------------------- 8
Southern armyworm:
  1,000 p.p.m. ----------------------------- 9
  500 p.p.m. ------------------------------- 6
Melon aphid: Percent
  1,000 p.p.m. ----------------------------- 9
  250 p.p.m. ------------------------------- 9
  50 p.p.m. -------------------------------- 9
Two-spotted spider mite:
  1,000 p.p.m. ----------------------------- 9
  250 p.p.m. ------------------------------- 9
  50 p.p.m. -------------------------------- 7
Milkweed bug:
  1,000 p.p.m. ----------------------------- 9
  100 p.p.m. ------------------------------- 9
Housefly, direct contact:
  500 p.p.m. ------------------------------- 9
  100 p.p.m. ------------------------------- 9
  10 p.p.m. -------------------------------- 8
Housefly, locus contact:
  1,000 p.p.m. ----------------------------- 9
  250 p.p.m. ------------------------------- 9
  50 p.p.m. -------------------------------- 9
Oriental cockroach:
  500 p.p.m. ------------------------------- 9

[2,2-dichloro-1-(4-methyl-5-oxo-3-trifluoromethyl-$\Delta^2$-1,2,4-triazolin-1-yl)vinyl]dimethyl phosphate Melon aphid: Percent
  1,000 p.p.m. ----------------------------- 9
  250 p.p.m. ------------------------------- 9
  50 p.p.m. -------------------------------- 7
Two-spotted spider mite:
  1,000 p.p.m. ----------------------------- 8
  100 p.p.m. ------------------------------- 6
Housefly, direct contact:
  1,000 p.p.m. ----------------------------- 9
  250 p.p.m. ------------------------------- 9
  50 p.p.m. -------------------------------- 7
Housefly, locus contact:
  1,000 p.p.m. ----------------------------- 9
  250 p.p.m. ------------------------------- 9
  50 p.p.m. -------------------------------- 8

[2-chloro-1-(4-methyl-5-oxo-3-trifluoromethyl-$\Delta^2$-1,2,4-triazolin-1-yl)vinyl]diethyl phosphate Mexican bean beetle: Percent
  1,000 p.p.m. ----------------------------- 9
  250 p.p.m. ------------------------------- 9
  50 p.p.m. -------------------------------- 8
Southern armyworm:
  1,000 p.p.m. ----------------------------- 9
  100 p.p.m. ------------------------------- 9
Melon aphid:
  500 p.p.m. ------------------------------- 9
  100 p.p.m. ------------------------------- 9
  10 p.p.m. -------------------------------- 9
Two-spotted spider mite:
  1,000 p.p.m. ----------------------------- 9
  250 p.p.m. ------------------------------- 9
  50 p.p.m. -------------------------------- 9
Housefly, direct contact:
  1,000 p.p.m. ----------------------------- 9
  250 p.p.m. ------------------------------- 9
  25 p.p.m. -------------------------------- 9
Housefly, locus contact:
  500 p.p.m. ------------------------------- 9
  100 p.p.m. ------------------------------- 9
  10 p.p.m. -------------------------------- 9
Oriental cockroach:
  1,000 p.p.m. ----------------------------- 9
  250 p.p.m. ------------------------------- 9
  100 p.p.m. ------------------------------- 8
Boll weevil:
  1,000 p.p.m. ----------------------------- 9
  250 p.p.m. ------------------------------- 9
  50 p.p.m. -------------------------------- 7

Dimethyl [1-(4-methyl-5-thioxo-3-trifluoromethyl-Δ²-1,2,4-triazolin-1-yl)vinyl] phosphate

| | |
|---|---|
| Mexican bean beetle: | Percent |
| 500 p.p.m. | 9 |
| 100 p.p.m. | 9 |
| 10 p.p.m. | 8 |
| Southern armyworm: | |
| 1,000 p.p.m. | 9 |
| 250 p.p.m. | 9 |
| 25 p.p.m. | 8 |
| Melon aphid: | |
| 250 p.p.m. | 9 |
| 50 p.p.m. | 9 |
| 5 p.p.m. | 8 |
| Two-spotted spider mite: | |
| 250 p.p.m. | 9 |
| 50 p.p.m. | 9 |
| 5 p.p.m. | 8 |
| Milkweed bug: | |
| 1,000 p.p.m. | 9 |
| 250 p.p.m. | 9 |
| Housefly, direct contact: | |
| 250 p.p.m. | 9 |
| 50 p.p.m. | 9 |
| 10 p.p.m. | 9 |
| Housefly, locus contact: | |
| 250 p.p.m. | 9 |
| 50 p.p.m. | 9 |
| 5 p.p.m. | 9 |
| Oriental cockroach: | |
| 1,000 p.p.m. | 9 |
| 250 p.p.m. | 9 |
| 25 p.p.m. | 9 |
| Boll weevil: | |
| 1,000 p.p.m. | 9 |
| 250 p.p.m. | 9 |
| 25 p.p.m. | 8 |

The pesticides of our invention are useful for killing pests on plants. They are also useful for the control of pests in many other environments where those pests are harmful. For example, the compounds can be combined with inks, adhesives, soaps, polymers, cutting oils, and paints for the control of pests in those substances or on surfaces to which those substances may be applied. Our compounds can be applied to textiles and to cellulose sheet materials, and can be employed in the impregnation of wood, lumber, and fibers. Our compounds can also be effectively used to protect stored grain or seeds from pests.

A special insecticidal use for which our compounds are well suited is killing mosquito larvae. As is well known, mosquito larvae spend their entire pre-adult existence in water. In order to control the larvae, it is necessary to get the larvicidal compound in contact with the larvae through the water. Our triazoline phosphates can be brought into contact with the larvae through the water by placing in the water any of the insecticidal compositions discussed below.

In order to control acarids and insects with our compounds, the compounds must be brought into contact with the pest. It is possible to contact the pest directly with the compound, or to deposit the compound on a locus which the pest infests. For example, a compound may be deposited on the pest's food, in water inhabited by the pest, on inert surfaces, on plants inhabited by the pest, or simply dispersed as an aerosol.

Our compounds are brought into contact with the pest to be killed, or with the locus of the pest, in the form of insecticidal or acaricidal compositions which are formulated according to standard methods in the agricultural chemicals art. In order to make the best methods of use of our compounds clear, some explanation of the formulation of our insecticidal and acaricidal compositions will be given.

Insecticidal and acaricidal compositions comprise one of our active triazoline phosphates and at least one inert carrier. Inert carriers may be chosen from liquids, solids, and in the case of aerosol compositions, even from the gases.

Most often, our compounds are prepared in the form of concentrated formulations which are applied to the pest's habitat in the form of water dispersions or emulsions containing from about 1 to about 1,000 p.p.m. of the active compound. Water-dispersible or emulsifiable concentrations are either solids usually known as wettable powders, or liquids usually known as emulsifiable concentrates.

Pesticidal wettable powders comprise an intimate mixture of the active compound, an inert carrier, and surfactants. The concentration of the active compound is usually, for the sake of economy, reasonably high, such as from 10 percent to 90 percent. The inert carrier, comprising from about 5 to about 90 percent of the composition, is usually chosen from amongst the attapulgite clays, the montrorillonite clays, the diactomaceous earths, or in exceptional cases from the purified silicates. Effective surfactants, which are usually used at the rate of from about 0.5 percent to about 10 percent, are usually chosen from among the sulfonated lignins, the condensed naphthalenesulfonates, the naphthalenesulfonates, the alkylbenzene sulfonates, the alkyl sulfates, and the nonionic surfactants such as ethylene oxide adducts of phenol.

Pesticidal emulsifiable concentrates of our phosphates usually comprise a convenient concentration of the active compound, such as from about ½ to about 4 pounds per gallon of liquid, dissolved in the inert carrier which is a mixture of water-immiscible organic solvent and emulsifiers. The organic solvent must of course be chosen with due regard to phytotoxicity, if the mixture is to be applied to plants, or to mammalian toxicity, and to cost. Useful organic solvents include the aromatics, especially the xylenes, and the petroleum fractions, especially mineral spirits and the high-boiling naphthaline and olefinic portions of petroleum including heavy aromatic naphtha. Other organic solvents may also be used, such as the terpenic solvents including derivatives of pine rosin and such solvents of high solvent potency as tetrahydrofuran and dimethyl sulfoxide. Suitable emulsifiers for emulsifiable concentrates are chosen from the same types of surfactants used for wettable powders.

It may be desirable to add substances to a water dispersion or emulsion of one of our active compounds in order to assist the active compound in adhering to the substance to which it is applied. For example, water-dispersible gums, polybutene compounds, cationic surfactants, and water-dispersible polymers are effectively used, especially for application to plants. Such substances can be useful in maintaining the triazoline compounds in contact with the locus of the pests.

Our compounds are also frequently applied to the habitat of pests in the form of dusts. The formulation of a pesticidal dust of one of our compounds usually requires no more sophisticated art than the intimate mixing of the finely ground pesticide with a finely ground, inexpensive, solid inert carrier. Widely-used insecticidal dust carriers include the kaolin clays, chalk, sulfur, pyrophyllite clays, montmorillonite clays, volcanic earths, and vegetable dusts such as ground walnut shell. Pesticidal dusts of our triazoline phosphates usually contain from 0.5 to about 5 percent of active compound, depending on the severity and the identity of the pest which is of primary concern. A stabilizer such as a glycol or an acid scavenger, such as epichlorohydrin, is necessary when dusts are to be made with active, highly sorptive clays.

When it is desired to suspend one of our compounds as an aerosol in order to contact airborne pests, the primary problem is to sufficiently atomize a solution of our compound. The most usual way to form pesticidal aerosols is to package the active compound in a pressurized package commonly known as an "aerosol bomb." Such products comprise a pressure-tight container filled with a solution of the active compound in an inert carrier which is a solvent mixed with propellants which are gases at normal ambient temperatures. The container is closed with an atomizing valve. The solvents and propellants must be chosen with due regard to their toxicity, since they are atomized along with the active compound.

Solvents for use in aerosol formulations are usually chosen from among the low molecular weight alcohols, the halogenated solvents especially methylene chloride, low molecular weight ketones such as acetone, and low molecular weight paraffins such as hexane. Propellants are chosen from among the hydrocarbon gases, especially propane and the butenes, the halocarbon gases such as carbon tetrafluoride, dichlorodifluoromethane, and 1,2-dichloro-1,1,2,2,-tetrafluoroethane, and in exceptional cases from among inert gases such as compressed nitrogen or carbon dioxide. Aerosol formulations of our compounds usually contain very small concentrations of the active compound, such as from about 0.005 percent to about 1 percent.

When our compounds are to be used for the control of pests which inhabit water or the earth, it may be convenient to formulate the compound as a granule. Such granules typically comprise the pesticidal compound dispersed on a granular inert carrier which is usually coarsely ground clay. The particle size of agricultural pesticidal granules usually ranges from about 0.1 to about 3 mm. The usual formulation process comprises dissolving the phosphorus compound in an inexpensive solvent, such as kerosene or heavy aromatic naphtha, and applying the solution to the carrier in an appropriate solids mixer. Less economically, our pesticidal compound may be dispersed in a dough composed of damp clay or other inert carrier. The dough is then dried and coarsely ground to produce the desired granular product.

A particularly preferred method of forming granules of our novel compounds is known as marumerization and is accomplished in specific equipment which was disclosed in U.S. Pat. 3,579,719. The marumerization process comprises the dispersion of the active compound in a damp dough of an appropriate inert carrier, particularly clay such as attapulgite clay, kaolin clay, or diatomaceous earth, the extrusion of the pesticidal dough through a die containing small holes in the range of from about 0.2 mm. to about 3 mm., and the rolling of the extrudate on a horizontal rotating plate. The plate rotates at the bottom of a vertical cylinder and is usually scored or roughened in order to increase the friction between the rotating plate and the extrudate. The rolling action of the particles of extrudate breaks the long particles into sections approximately as long as the extrudate is thick, rolls the broken particles against one another, and forms the particles into rounded ellipsoidal or approximately spherical granules which have superior uniformity of particle size, freedom from dust, and flow characteristics.

Mixtures of pesticides, such as two or more insecticides or an insecticide and a fungicide, are often used to allow treatment of a habitat for control of several pests by one application. The use of our triazoline phosphates in such mixtures is feasible and is within the scope of our invention.

Compounds within the scope of our invention have useful biological activities other than their insecticidal and acaricidal activities. Some of our compounds are fungicides and herbicides. Our fungicidal triazoline phosphates are useful for the control of fungi such as, for example, bean rust and anthracnose.

When our compounds are to be used for the control of crop-afflicting pathogens such as bacterial rust of beans, the compounds may be formulated and applied to the locus of the organism to be killed as compositions identical to our insecticidal and acaricidal compositions.

We claim:
1. A compound of the formula

$$\begin{array}{c} R^1-C-R^2 \quad O \quad O-R^5 \\ \| \quad \| \quad / \\ F \quad N-N-C-O-P \\ | \quad | \quad \| \quad \backslash \\ F-C-C \quad C=X \quad O-R^5 \\ | \quad \backslash \quad / \\ R^3 \quad N \\ | \\ R^4 \end{array}$$

X represents
   (A) oxygen, or
   (B) sulfur;
$R^1$ and $R^2$ independently represent
   (A) chloro,
   (B) bromo,
   (C) $C_1$–$C_2$ alkyl, or
   (D) hydrogen;
$R^3$ represents
   (A) hydrogen,
   (B) fluoro,
   (C) chloro,
   (D) trifluoromethyl, or
   (E) difluoromethyl;
$R^4$ represents
   (A) $C_1$–$C_4$ alkyl,
   (B) $C_3$–$C_4$ alkenyl,
   (C) $C_3$–$C_8$ cycloalkyl,
   (D) $C_2$–$C_6$ dialkylamino, or
   (E)

$$N=C\begin{array}{c} R^6 \\ \backslash \\ R^7 \end{array};$$

$R^5$ represents $C_1$–$C_4$ alkyl;
$R^6$ and $R^7$ independently represent
   (A) hydrogen,
   (B) $C_1$–$C_4$ alkyl, or
   (C) phenyl, optionally monosubstituted with
      (1) $C_1$–$C_3$ alkyl,
      (2) $C_1$–$C_3$ alkoxy,
      (3) halo, or
      (4) $C_1$–$C_3$ haloalkyl.

2. The compound of claim 1 which is [2-chloro-1-(4-methyl - 5 - thioxo-3-trifluoromethyl-$\Delta^2$-1,2,4-triazolin-1-yl)vinyl] diethyl phosphate.

3. The compound of claim 1 which is diethyl [1-(4-methyl - 5 - thioxo-3-trifluoromethyl-$\Delta^2$-1,2,4-triazolin-1-yl)vinyl] phosphate.

4. The compound of claim 1 which is diethyl [1-(4-methyl - 5 - thioxo-3-trifluoromethyl-$\Delta^2$-1,2,4-triazolin-1-yl)propenyl] phosphate.

5. The compound of claim 1 which is dimethyl [1-(4-methyl - 5 - thioxo-3-trifluoromethyl-$\Delta^2$-1,2,4-triazolin-1-yl)vinyl] phosphate.

6. The compound of claim 1 which is diethyl [1-(4-methyl - 5 - oxo-3-trifluoromethyl-$\Delta^2$-1,2,4-triazolin-1-yl) vinyl] phosphate.

References Cited
UNITED STATES PATENTS

| 3,594,390 | 7/1971 | Timmler et al. | 260—308 R |
| 3,719,686 | 3/1973 | Cebalo | 260—308 R |

FOREIGN PATENTS

| 18,747 | 8/1965 | Japan | 260—308 R |

ALTON D. ROLLINS, Primary Examiner

U.S. Cl. X.R.

260—240 G, 552 SC; 424—200

UNITED STATES PATENT OFFICE
CERTIFICATE OF CORRECTION

Patent No. 3,780,052    Dated December 18, 1973

Inventor(s) Tony Cebalo and John L. Miesel

It is certified that error appears in the above-identified patent and that said Letters Patent are hereby corrected as shown below:

Column 3, line 29, replace triazolin-1-yl$\_$-2-methylpropyl$\_$ di-t-butyl phosphate with --- triazolin-1-yl$\_$-2-methyl<u>propenyl</u>$\_$ di-t-butyl phosphate ---.

Column 3, line 63, replace 5-thioxo-$\Delta^2$-1,2,4-triazolin-1-yl$\_$ diethyl $\_$phosphate with --- 5-thioxo-$\Delta^2$-1,2,4-triazolin-1-yl$\_$-<u>vinyl</u>$\_$ diethyl phosphate ---.

Column 6, line 48, insert the word <u>diethyl</u> before the word "phosphate

Column 8, line 40, delete the word $\_$Percent$\_$.

Column 9, line 4, delete the word $\_$Percent$\_$.

Column 9, line 41, delete the word $\_$Percent$\_$.

Column 10, line 4, delete the word $\_$Percent$\_$.

Column 10, line 35, delete the word $\_$Percent$\_$.

Column 10, line 60, should read 100 p.p.m.----9, not $\_$100 p.p.m. ----5$\_$.

Column 10, line 63, should read 100 p.p.m.----6, not $\_$100 p.p.m. ----5$\_$.

Column 10, line 68, delete the word $\_$Percent$\_$.

Column 11, line 1, delete the word $\_$Percent$\_$.

Column 11, line 30, delete the word $\_$Percent$\_$.

Column 11, line 70, delete the word $\_$Percent$\_$.

PO-1050
(5/69)

UNITED STATES PATENT OFFICE
CERTIFICATE OF CORRECTION

Patent No. 3,780,052          Dated December 18, 1973

Inventor(s)    Tony Cebalo and John L. Miesel

It is certified that error appears in the above-identified patent and that said Letters Patent are hereby corrected as shown below:

Column 12, line 1, delete the word [Percent].

Column 12, line 25, delete the word [Percent].

Column 12, line 44, delete the word [Percent].

Column 13, line 4, delete the word [Percent].

Column 15, line 15, change [butenes] to --- butanes ---.

Signed and sealed this 2nd day of July 1974.

(SEAL)
Attest:

EDWARD M. FLETCHER,JR.          C.MARSHALL DANN
Attesting Offcier                 Commissioner of Patents